(No Model.)

W. F. HARRISON.
VALVE.

No. 579,432. Patented Mar. 23, 1897.

Witnesses:
J. F. Coleman
Nellie Callahan

Inventor:
William F. Harrison,
by W. N. Finckel
Atty.

UNITED STATES PATENT OFFICE.

WILLIAM F. HARRISON, OF PITTSBURG, PENNSYLVANIA, ASSIGNOR TO THE HOMESTEAD MANUFACTURING COMPANY, LIMITED, OF HOMESTEAD, PENNSYLVANIA.

VALVE.

SPECIFICATION forming part of Letters Patent No. 579,432, dated March 23, 1897.

Application filed June 8, 1896. Serial No. 594,787. (No model.)

*To all whom it may concern:*

Be it known that I, WILLIAM F. HARRISON, a citizen of the United States, residing at Pittsburg, in the county of Allegheny and State of Pennsylvania, have invented a certain new and useful Improvement in Valves, of which the following is a full, clear, and exact description.

This invention relates to an adaptation to three-way and four-way valves and the like of a device for controlling the opening and closing movements of the plug, such, for example, as contained in the patents of the Homestead Manufacturing Company, Limited, Nos. 560,993 and 560,994, dated May 26, 1896. In the former patent a non-rotating floating collar having inclines is interposed between corresponding inclines upon the head of the plug and a fixed portion of the valve-casing, and in the latter patent an immovable device having inclines is applied to similar inclines on the plug, and in both cases these devices serve to arrest the undue movements of the plug in opening and closing the valve. In the present invention inclines are made upon the head of the plug, and a non-rotating or a partially-rotating floating collar or a fixed device having inclines is employed. The plug is ported either for use as a four-way valve or for use as a three-way or a four-way valve. I have found it advantageous to balance the plug in its seat by the admission of the pressure above and below the same, and the provision of means to this end is another feature of my invention.

The invention herein is designed primarily for use in connection with pressure-cylinders using, for example, water for opening and closing the doors or gates of pits for soaking ingots, but obviously the invention is not limited to any special application or use. Nevertheless I will describe my invention as designed for use with these aforementioned cylinders.

Figure 1:
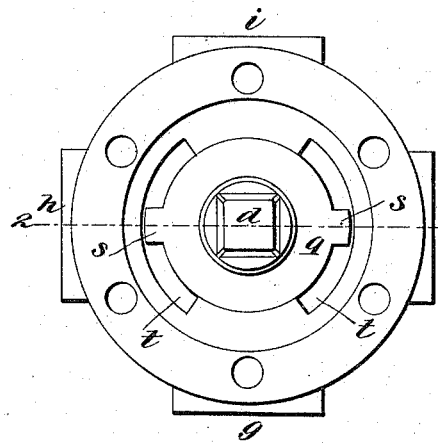
Figure 2:
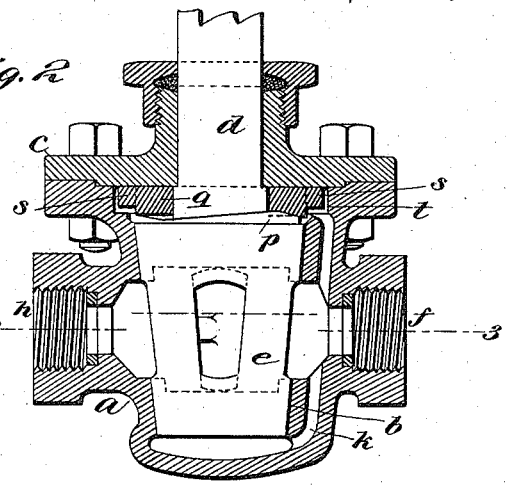
Figure 3:
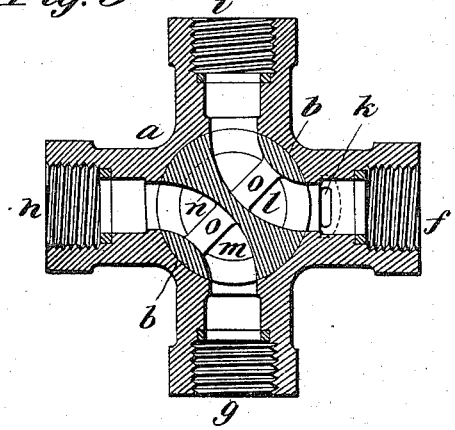
Figure 4:
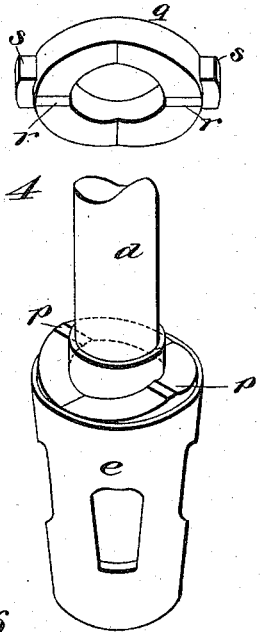
Figure 5:
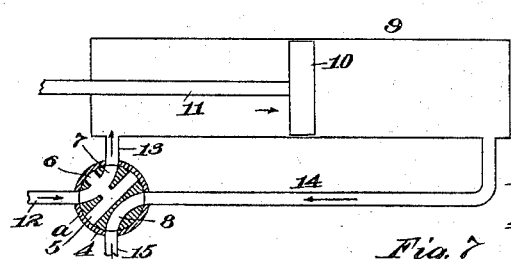
Figure 6:
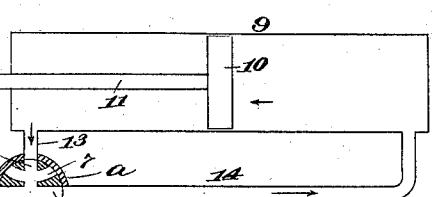
Figure 7:
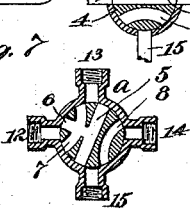

In the accompanying drawings, illustrating my invention, in the several views of which like parts are similarly designated, Figure 1 is a top plan view with the cap removed. Fig. 2 is a vertical section with the cap in place, the section being in the plane of line 2 2, Fig. 1. Fig. 3 is a horizontal section taken in the plane of line 3 3, Fig. 2. Fig. 4 shows in perspective the plug and the restraining device. Fig. 5 is a diagrammatic view showing the combined three and four way valve as applied to one of the cylinders hereinbefore referred to, showing the valve in position to supply the fluid for the direct stroke of the piston; and Fig. 6 is a similar view showing the valve in position to apply the fluid for the return stroke. Fig. 7 is a horizontal section corresponding to Fig. 3, showing the combined three and four way valve in a wholly-closed position.

The casing $a$ may be of any approved construction, and in the illustration shown is provided with a central tapering plug-seat $b$, opening at the top and closed at the bottom, and having a cap or cover $c$ bolted or otherwise fixed thereto and adapted in any usual way to receive the stem $d$ of the plug $e$, hereinafter more particularly described. The casing is provided with the inlet-nipple $f$ and the three several nipples $g$, $h$, and $i$. Said casing at its inlet side is made with the channel $k$, which extends from beneath the plug-seat upward to a point above the plug-seat, where it opens. The said channel $k$ also opens into the inlet-port, so as to receive a portion of the fluid and distribute it above and below the plug, in order to balance the plug and thereby facilitate the rotation of such plug.

The plug is made with two channels or ports $l$ and $m$, described on the arcs of circles and wholly separated from one another by the septum $n$; and inasmuch as I prefer to make large ports it may be and in some instances is well to reinforce the walls of the plug by means of bridges $o$ thrown across these ports $l$ and $m$. The head of the plug is made with the opposite double inclines $p$ $p$, whose highest points are in line with the septum and between the ports $l$ and $m$.

$q$ is one form of restraining device, the same being shown as an annulus adapted to be slipped over the stem of the plug loosely and supplied with the two double inclines or cams

*r*, which correspond with the double inclines or cams *p* of the plug. This restraining device is shown as provided with diametrically-opposed laterally-projecting lugs *s*, which rest in recesses *t* in the flange which surrounds the opening in the upper portion of the casing *a*. The highest points of the cams on the restraining device are in line with these lugs and normally rest in the depressions between the highest points of the cams or inclines upon the head of the plug.

In the operation of the valve the restraining device *q* will be carried around with the plug frictionally until it is arrested by the engagement of its lugs with the ends of the recesses *t*, and thereupon, upon further rotation of the plug, the highest points of the cams upon the plug and the restraining device will approach and if, as may be the case, the restraining device is capable of floating longitudinally of the stem, such restraining device will be lifted until it is abutted against the cap, and thereafter its cams acting upon the cams of the plug will serve to force the plug tight to its seat. The reverse motion will effect the easy movement of the plug upon its seat. If, on the other hand, the restraining device be non-floating, then provision will be made for a certain amount of lost motion of the plug in its seat. If, as may be the case, the restraining device is non-rotary, the play between the cams of the plug and the cams of the restraining device will be proportioned accordingly in order to permit the necessary movement of the plug and at the same time insure the seating of the plug at all times.

As is plain from the drawings, Fig. 3, the inlet may be put into communication by port *l* with the nipple *i*, and may be put into communication by port *m* with the nipple *g*, and thus the fluid may be admitted to opposite ends of the cylinder for use in driving the piston therein.

In Figs. 5, 6, and 7, in which the combined three-way and four-way valve is shown, the casing *a* is of any approved construction, and the plug 4 is provided with a straightway port 5. A straight port 6 opens out at right angles from the port 5 and intersects a segmental port 7, and an independent segmental port 8 is arranged at the opposite side from the port 7.

9 is a cylinder containing a piston-head 10, adapted to reciprocate therein and having the piston-rod 11 projecting out of the cylinder from one side of the said piston-head. The valve is provided with the inlet pipe or nipple 12 and is connected with one end of the cylinder by means of a pipe or nipple 13 and with the other end of the cylinder by means of a pipe or nipple 14.

15 is the outlet.

Now if the ports of the valve be arranged as shown in Fig. 5 the fluid will be admitted to the left-hand end of the cylinder, so as to act upon the piston to force it in the direction of the arrow thereon for the direct stroke, and meanwhile the fluid in the other end of the cylinder will be discharged or exhausted (or returned to the source of supply) through the pipe 14, port 8, and pipe 15. In order to obtain the reverse movement of the piston and at the same time save the pressure fluid which was used to move it to the right-hand end of the cylinder, the plug is shifted so as to present its ports as in Fig. 6. In this position the fluid will pass through the straightway port 5 into the pipe 14 and into the right-hand end of the cylinder, and inasmuch as the pressure area of the other side of the piston-head is less than the pressure area of the right-hand side of the piston-head by the area of the piston-rod it follows that there is a greater superficial pressure upon the right-hand side of the piston-head, and consequently the fluid will be expelled from that left-hand end of the cylinder and thus may be saved. In this position of the valve the outlet is wholly closed, and thus the valve serves simply as a three-way instead of a four-way valve. Nevertheless, as is obvious, the plug ported as is the plug in Figs. 5, 6, and 7 may be used in a casing ported as is the casing in Fig. 3, and vice versa.

What I claim is—

1. A valve comprising a casing provided with four-way ports, a rotary plug seated therein and ported to register with the said ports of the casing, and a restraining device for controlling the opening and closing movements of the plug and for positively insuring the seating of the plug, and consisting of double inclines or cams on the head of the plug and a corresponding series of cams arranged above the plug and within the casing, substantially as described.

2. A valve comprising a casing ported for four-way service, a plug seated in said casing and provided with combined three-way and four-way channels or ports, and means, such as complemental double inclines or cams on the plug and a ring interposed between the plug and the casing, for seating the plug, substantially as described.

3. A valve comprising a casing ported for four-way service and provided with segmental recesses in the flange of its head, a plug seated in said casing and provided with ports to register with the ports of the casing, double inclines or cams on the head of said plug, and a ring interposed between the head of the plug and the casing and provided with double inclines or cams complemental to those on the plug, and having lateral lugs arranged in the segmental recesses of the casing, whereby the said ring is capable of a rotary motion until arrested by the engagement of its lugs with the ends of the recesses, substantially as described.

4. In a valve, the combination with the casing, a plug seated therein, a restraining device for controlling the opening and closing movements of the plug and for positively insuring the seating of the plug, and consisting of double inclines or cams on the head of the plug and a corresponding series of cams arranged above the plug and within the casing, and a channel in the casing for introducing the fluid from the service-pipe above and below the plug, substantially as and for the purpose described.

In testimony whereof I have hereunto set my hand this 6th day of June, A. D. 1896.

WILLIAM F. HARRISON.

Witnesses:
FREDERICK SCHUCHMAN,
GEORGE W. GILES.